2,991,186
CONCRETE COMPOSITION
Umberto Furlan, 1133 St.-Jean St., Quebec,
Quebec, Canada
No Drawing. Filed Aug. 24, 1959, Ser. No. 835,448
Claims priority, application Canada Nov. 13, 1958
4 Claims. (Cl. 106—98)

The present invention relates to a new concrete composition for use as ordinary concrete incorporating Portland cement being no more expensive than said cement and more particularly for use under conditions in which the concrete is subjected to variations of temperature.

It is well known that conventional concrete has a rather poor resistance to variations of temperature and more particularly when exposed to temperature variation between values above and below the freezing point.

It is a common occurrence that the exposed surface of concrete sidewalks, roadways, structures or the like in northern climates often become pitted or otherwise breaks down in small fragments under the action of weather.

Accordingly the general object of the present invention is the provision of a new concrete composition which has an improved resistance to temperature variations more particularly to continuous subjection to freezing weather.

Still another important object of the present invention is the provision of a concrete composition having an improved waterproofness and forming a smoother outer surface than conventional concrete.

Still another important object of the present invention is the provision of a concrete composition of the character described having also an improved resistance to temperature in the range of 200° to 500° F.

Yet another important object of the present invention is the provision of a concrete composition of the character described which can be used for roadways, sidewalks, buildings, bridges and all similar applications where the concrete is subjected to variations of temperature alternating above and below the freezing point.

According to the invention, talc is added to an otherwise conventional mixture for making concrete; the talc used has a grain size as found in the commerce and such as sold for instance as talc powder by drug stores. Such talc is no more expensive than ordinary Portland cement which it replaces in part.

According to the present invention, the talc to be added to the concrete mixture should be in the range of between 20% and 50% of the weight of the Portland cement. If the talc is in an amount of less than 20%, the resulting concrete will have substantially the properties of ordinary concrete. If on the other hand, the talc is in an amount of more than 50%, the force of cohesion of the resulting concrete will be excessively decreased.

The talc and the Portland cement are first mixed in the dry state to form a uniform mixture. Thereafter, this mixture is added to sand, gravel, and water in the usual manner, for making concrete from Portland cement.

The resulting product has a less porous outer surface than ordinary concrete and has a waterproofness which is at least 30% more than the waterproofness or impermeability of ordinary concrete.

Moreover, the concrete made from the composition of the present invention has a much increased resistance to variations of temperature.

*Example 1.*—A concrete having the following composition was prepared:

| | | | |
|---|---|---|---|
| Portland cement | 600 parts or | 26.5% | by weight |
| Talc | 210 parts or | 9.4% | by weight |
| Sand | 600 parts or | 26.5% | by weight |
| Gravel | 600 parts or | 26.5% | by weight |
| Water | 250 parts or | 11.1% | by weight |
| Total | 2,260 parts or | 100.0% | by weight |

The talc and cement were first mixed in the dry state to forming a uniform mixture which was thereafter incorporated in the sand and gravel with the addition of water in the usual method for preparing concrete. The concrete was allowed to set. It was found to cure in the normal time required for the curing of conventional concrete.

Test blocks of the above mentioned composition together with blank blocks of conventional concrete, that is concrete in which the talc in the above mentioned composition was replaced by Portland cement, were tested in a refrigerator in the following manner. A block having the composition of the present invention was placed side by side with a block of usual composition in a refrigerator at 30° F. and after eleven hours the two blocks were removed and immediately immersed in water at 60° F. for an hour. After the water treatment, they were placed back in the refrigerator for another eleven hours.

After ten days of continuous alternating treatment as above it was found that the blocks made with the new composition of the present invention had no defect whatsoever whereas after three treatment cycles it was found that scratching of the outer surface of the blocks of conventional concrete composition resulted in breaking down of concrete particles and also in the loss of concrete under the form of a powder. There was no powder formation in the block having the new composition of the present invention even after twenty treatment cycles as outlined above.

*Example 2.*—Blocks of a concrete having the following composition were prepared:

| | | | |
|---|---|---|---|
| Portland cement | 264 parts or | 23.5% | by weight |
| Talc | 102 parts or | 9.1% | by weight |
| Sand | 600 parts or | 53.8% | by weight |
| Water | 158 parts or | 14.1% | by weight |
| Total | 1,124 parts or | 100.0% | by weight |

As in Example 1 the cement and talc were first mixed in the dry state and then mixed with the sand with the addition of water.

Several test cylinders of the above concrete composition was made and tested in the universal Riehle machine to determine the compression strength. It was found that the compression strength compared very well with concrete test cylinders having the same composition as above, except that the talc was replaced by Portland cement.

Other test cylinders were tested in a Amsler universal machine to determine the moduli of rupture and it was found also that these moduli compared favourably with concrete test cylinders having the composition described above but with the talc replaced by Portland cement. Thus the composition of the present invention can be put to the same structural uses as conventional concrete.

Bricks were made with the composition mentioned above and together with bricks in which the talc was replaced by Portland cement, were subjected to a cyclic test, that is, bricks of the two compositions were placed side by side first in a refrigerator for thirteen hours at 25° F., then in water at 60° F. for one hour, then in an electric oven and back to the refrigerator. At each test cycle, the time of oven treatment and temperature of the oven were increased by steps of one hour and 50° F. respectively, starting from two hours and 250° F. to seven hours and 450° F.

Upon removal from the oven after the third cycle, it was found that the two bricks had a curvature which remained when the two bricks were cooled down to room temperature. After the sixth cycle, the brick made of ordinary concrete became reddish in colour and hammering of the same resulted in the complete breaking down of said brick under the form of powder, while the brick having the composition of the present invention broke under hammering into well defined chunks. The treatment cycles were continued up to sixteen times for the bricks of the present invention and no changes in behavior were noted.

From the foregoing, it is apparent that the addition of talc in the range of between 20% and 50% and more preferably in the amount of 35% of the weight of the Portland cement, imparts a great resistance to temperature variations to an otherwise ordinary concrete composition.

While a preferred embodiment in accordance with the present invention has been described, it is understood that various modifications may be made without departing from the spirit and scope of the invention as defined in the annexed claims.

What I claim is:

1. A concrete composition having the following ingredients: 600 parts of Portland cement, 210 parts of talc, 600 parts of sand, 600 parts of gravel and 250 parts of water.

2. A concrete composition consisting of the following ingredients: 264 parts of Portland cement, 102, parts of talc, 600 parts of sand and 158 parts of water.

3. A concrete composition capable of setting to form a hard mass, consisting of 8 to 15% water, 20 to 30% Portland cement, and 8 to 10% talc in powder form, the remaining part of said composition being an aggregate, the precentages being on a weight basis.

4. A concrete composition as claimed in claim 3, wherein said aggregate is a mixture of sand and gravel in about equal proportion.

References Cited in the file of this patent

UNITED STATES PATENTS

| | | |
|---|---|---|
| 76,806 | Pelletier | Apr. 14, 1868 |
| 217,713 | Steward | July 22, 1879 |
| 288,262 | Rowland | Nov. 13, 1883 |
| 392,482 | Williams | Nov. 6, 1888 |
| 703,516 | Arnn | July 1, 1902 |
| 927,312 | Anderson | July 6, 1909 |
| 1,586,731 | Anft | June 1, 1926 |
| 1,604,169 | Johnston | Oct. 26, 1926 |
| 1,861,317 | Moross | May 31, 1932 |
| 2,127,451 | Scripture | Aug. 16, 1938 |
| 2,588,438 | Waide | Mar. 11, 1952 |